Figure 1:
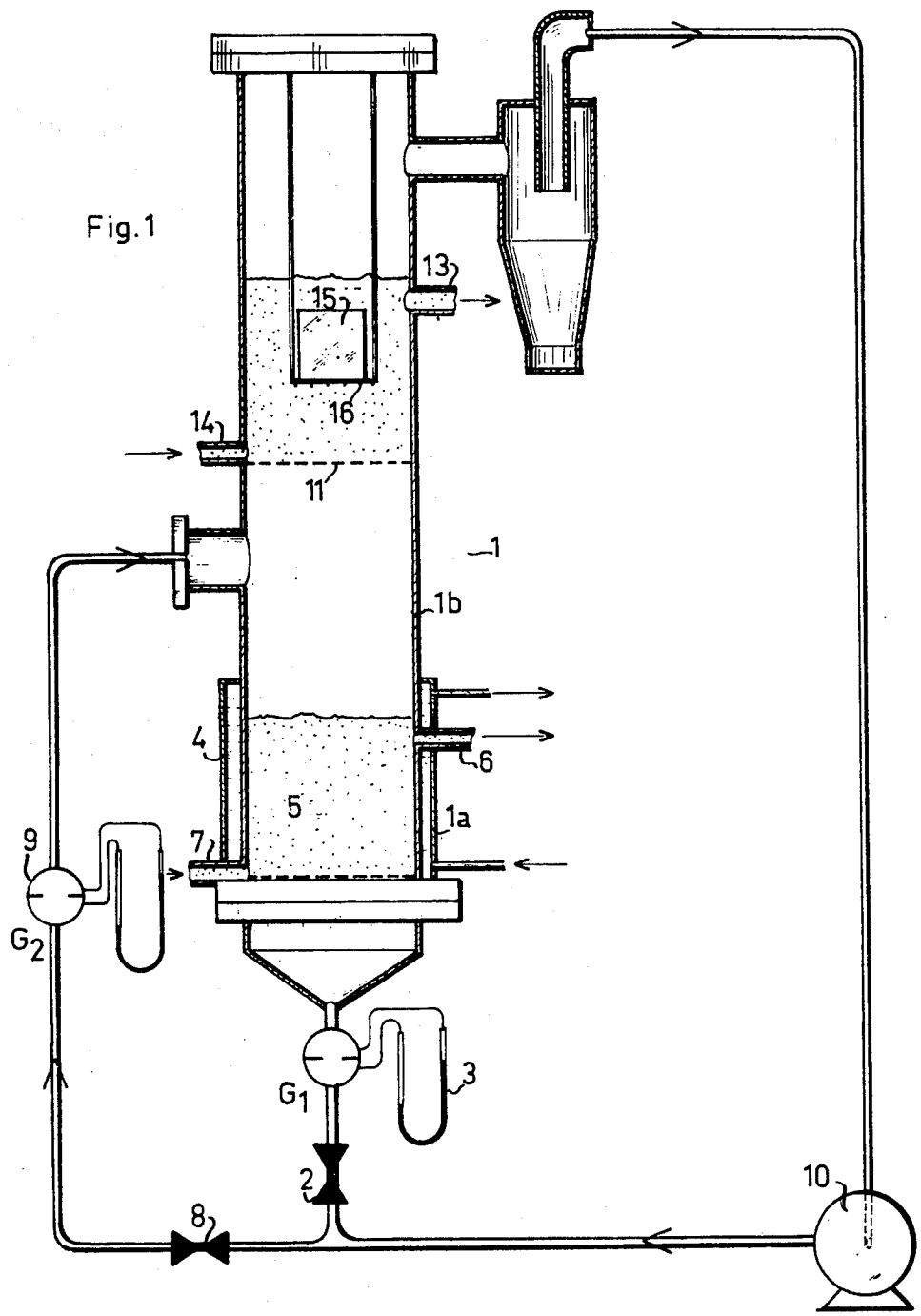

United States Patent [19]

Gibert

[11] 4,175,334
[45] Nov. 27, 1979

[54] METHOD OF AND APPARATUS FOR FREEZE-DRYING PREVIOUSLY FROZEN PRODUCTS

[75] Inventor: Henri Gibert, Montpellier, France

[73] Assignee: Agence Nationale de Valorisation de la Recherche (ANVAR), Neuilly-sur-Seine, France

[21] Appl. No.: 866,012

[22] Filed: Dec. 30, 1977

[30] Foreign Application Priority Data

Dec. 31, 1976 [FR] France .............................. 76 39864

[51] Int. Cl.² .............................................. F26B 5/06
[52] U.S. Cl. .................................................... 34/5
[58] Field of Search ........................................ 34/5, 92

[56] References Cited

U.S. PATENT DOCUMENTS

| | | | |
|---|---|---|---|
| 3,239,942 | 3/1966 | Mink et al. | 34/5 |
| 3,253,344 | 5/1966 | Gelder | 34/5 |
| 3,313,032 | 4/1967 | Malecki | 34/5 |
| 3,319,344 | 5/1967 | Sachsel et al. | 34/5 |
| 3,453,741 | 7/1969 | King et al. | 34/5 |

Primary Examiner—John J. Camby
Attorney, Agent, or Firm—Shlesinger, Arkwright, Garvey & Dinsmore

[57] ABSTRACT

A method for freeze drying a previously frozen product by placing the product in a fluidized bed of a finely divided solid purticulate water vapor adsorbent and adjusting the partial pressure of water vapor to a level at which frozen water in the product will sublime.

11 Claims, 2 Drawing Figures

METHOD OF AND APPARATUS FOR FREEZE-DRYING PREVIOUSLY FROZEN PRODUCTS

The present invention relates to a method of and apparatus for freeze-drying a previously frozen product. The method may be applied in a large number of industrial fields and in particular in the pharmaceutical field and the field of food-stuffs.

It is known that freeze-drying, a method of dehydrating a frozen product by subliming water is an excellent technique for preserving a product, particularly an organic product. It enables the product to be almost completely dehydrated while causing the minimum change in its structure and organoleptic characteristics.

The only current method which gives satisfactory results on an industrial scale consists in exposing the product, after it has been frozen, to a heat source in a sealed enclosure in which a high vacuum is produced. The operation is conducted in such a way that the external temperature of the product never exceeds a critical value, generally of the order of 60° C., beyond which the product is adversely affected. The water vapour from the dehydration is removed as it forms so that its partial pressure remains less than the triple point pressure for water (4.95 millimeters of mercury), failing which the ice melts and there is no sublimation.

This conventional method has two main drawbacks:

The operation takes place under a high vacuum, which entails a considerable expenditure of energy and complications of a technical nature. Certain volatile substances which produce aromas are removed in the course of operation by the suction system which generates the vacuum.

The operation is a lengthy one. This is due to the poor exchanges of matter and heat which take place between the gas and the product to be freeze-dried due to therefore the poor contact between the product and the gas acting as the medium for transporting the water vapour, the very low thermal conductivity in a rarefied atmosphere, and the very small difference in exchange potential at low pressure, this difference determining the speed of migration of the water molecules in the product.

As a result of these drawbacks the method is very expensive to put into practice and is more costly the more water is contained by the product to be dealt with. Thus, at the present time freeze-drying is a technique reserved for products such as pharmaceutical products, whose initial cost per unit of weight is very high. It is much too expensive for products whose initial cost is low and/or which contain a large amount of water, as is the case with many food products (fruit juices for example).

Efforts have been made to improve the method but none has given very satisfactory results as far as industrial applications are concerned. In particular, as disclosed in U.S. Pat. Specification No. 3,319,344, an attempt has been made to fluidise the product to be freeze-dried under vacuum in order to improve the exchanges, but on the one hand the drawbacks resulting from operating under vacuum are not overcome and on the other fluidising the product under high vacuum proves to present very great difficulties.

It has also been proposed in U.S. Pat. Specification No. 3,453,741, to mix the frozen product as a dense layer with a water vapour adsorbent with the aim of extracting the water from the frozen product. However achieving a satisfactory level of efficiency in practice entails operating under a moderate vacuum. In addition, in the vicinity of the product to be freeze-dried the adsorbent material quickly becomes saturated and there is a rise in temperature due to the adsorption phenomenon, which tends to reduce the efficiency of the freeze-drying and in this method tends to bring with it a considerable risk of the water contained in the product melting (rather than subliming) if the mean temperature is not adjusted to a very low level.

In addition, certain types of freeze-drying are conducted at ambient pressure using a current of very cold, dry air and, to improve the exchanges, it has been proposed in certain quarters to fluidise the frozen product in the current of cold air, which can be recycled so as to be dried in a separate enclosure in particular by using an adsorbent bed as disclosed in U.S. Pat. No. 3,313,032. However methods of this kind take a relatively long time in practice and call for operation at very low temperature (always less than the temperature at which the product begins to melt, which may be $-30°$ to $-40°$ C. in the case of sweetened juices).

Generally, it is an object of the invention to remedy or minimise the drawbacks referred to above and to provide a method of freeze-drying which does not make it necessary to operate under vacuum or at very low temperature, and one particular object is to enable freeze-drying to be performed at ambient pressure and at a temperature higher than the temperature at which the product concerned begins to melt.

Accordingly, the invention consists in a method of freeze-drying a previously frozen product, which comprises fluidising in an enclosure, a water vapour adsorbent present in the divided state in the form of solid particles, by placing these particles in suspension in a carrier gas having a low moisture content, placing the product to be freeze-dried in the fluidised layer, and adjusting the temperature of the fluidised layer and the partial pressure of water vapour in the enclosure in such a way that the frozen water contained in the product sublimes.

The terms "fluidise" or "fluidising" are to be understood to mean any suspension, flotation or circulation of the particles of adsorbent in the carrier gas.

The invention also consists in apparatus for carrying out the method.

In a preferred mode of operation, the temperature of the fluidised layer and the partial pressure of water vapour in the enclosure are so adjusted that the interface temperature at the frozen areas of the product is at all times lower than a threshold equal to the temperature $T_f$ at which the product begins to melt at the overall pressure prevailing in the enclosure, the partial pressure of water vapour being at all times held below that which corresponds to the triple point of water.

If the product to be freeze-dried is present in the divided state in the form of small particles, whether this is its natural state or whether it may be divided by preliminary treatment, it is advantageous to form an intimate mixture of this product and the adsorbent and then to float it or fluidise it with the latter.

In the opposite case, where the product is in compact form or in the form of large particles and is impossible to place in suspension in the fluidised layer, it is placed in the fluidised layer by means of a support (a basket, suspension member, etc) which is adapted to permit good contact between the outer surfaces of the said product and the fluidised layer.

Whichever case is considered, the freeze-drying method according to the invention derives its novelty and its advantages from the fact that it brings together two phenomena simultaneously, namely adsorption and fluidisation, which co-operate to have the following effects:

(a) exchanges of matter and heat of an excellent standard are obtained between the product to be freeze-dried and the fluidised layer, enabling stable, balanced conditions with attendant high efficiency to be established, (b) a heat input is provided in situ at the surfaces of the product to be freeze-dried by the heat released by the adsorption phenomenon, this input being enough in practice to bring about sublimation since the latent heats of sublimation and adsorption of water vapour are of the same order of magnitude, (c) the water vapour withdrawn from the product is immediately trapped in the immediate neighbourhood of its frozen surface, and (d) the temperature and water vapour content of the fluidised layer are perfectly uniform because of the continual agitation which prevails within it.

The result of these effects is that it is easy to control the partial pressure of water vapour and also the temperature within the enclosure and that this control gives control over the conditions prevailing at the interfaces of the frozen areas of the product to be freeze-dried (interface temperature, partial pressure of water vapour at the interfaces). Depending on the various substances present, control of this nature thus enables the interface conditions necessary for sublimation to be met (interface temperature less than the temperature $T_f$ at which the product begins to melt at the overall operating pressure, partial pressure at the interface less than the triple point pressure for water). Interfaces should be understood to mean the separating surfaces between, on the one hand, the frozen areas of the product and, on the other hand, already freeze-dried areas of the latter or the fluidised layer itself.

The temperature of the fluidised layer may be adjusted to an appropriate level by adjusting the inlet temperature of the carrier gas. This temperature may also be adjusted by means of a heat-exchanger associated with the enclosure and by regulating the throughput of carrier gas.

The partial pressure of water vapour in the enclosure is adjusted to an appropriate level by metering out the adsorbent by weight in relation to the product to be freeze-dried, allowing for the initial moisture content and the adsorptive ability of the adsorbent used.

The method may be operated in discontinuous cycles. The adsorbent is then placed in the enclosure at the beginning of each cycle so that its mass relative to that of the product and its initial moisture content give rise, at the end of the cycle, to a partial pressure of water vapour in the enclosure which meets the interface conditions set forth above.

The method may also be put into practice continuously and this is one of its additional advantages. In this case the enclosure is fed continuously with regenerated adsorbent at a rate and a moisture content such that the partial pressure of water vapour in the enclosure conforms to the interface conditions at all times. Adsorbent is continuously extracted at an equal rate to allow it to be regenerated.

The method according to the invention may be put into practice at atmospheric pressure and it is this manner of operation which will in practice be selected in the majority of industrial cases owing to the ease with which it can be put into effect and the technical simplification in which it results.

To increase the difference in exchange potential at the interfaces of the product to be freeze-dried, and thus the speed of sublimation, the partial pressure of water vapour in the enclosure is advantageously held at the lowest possible level and preferably one lower than approximately a fiftieth of the triple point pressure for water. This latter condition is easily satisfied in the generality of cases without the proportions of adsorbent becoming excessive. The adsorbent used is preferably of small granular size (between approximately 100 microns and 1 millimeter) and has a high capacity for adsorbing water vapour. To freeze-dry a food product for example, the adsorbent selected may be 4A molecular sieves which have an adsorptive capacity which is selective, being very high for water vapour and low for the majority of volatile substances which produce aromas.

The temperature of the fluidised layer is advantageously adjusted to the maximum permissible value which, bearing in mind the value of the partial pressure, enables an interface temperature to be obtained which is close to and below the melting point $T_f$. In this way the speed at which the product is freeze-dried is increased to the maximum, while the operating conditions are still maintained at their most favourable. For many products whose melting point is close to 0° C., the temperature for the fluidised layer which satisfies this requirement is positive. It is for example approximately 9° C. for ice in a fluidised layer of activated alumina with the partial pressure of water vapour maintained at a level lower than 0.1 mm of mercury.

Furthermore, the speed of the carrier gas in the enclosure is preferably adjusted to a level between approximately 1.3 $V_{mf}$ and approximately 1.7 $V_{mf}$, $V_{mf}$ being the minimum fluidisation speed of the product or products in the divided state. On the evidence of trials, these appear to be the optimum conditions for achieving good results (good fluidisation of the layer with no "piston" phenomenon, exchanges of matter and heat of an excellent standard, complete uniformity of the temperature and partial pressure conditions prevailing within the layer). The gas selected as a carrier gas may be one of low molecular weight to improve still further the conditions of heat transfer.

In order that the invention may be more clearly understood, reference will now be made to the accompanying drawings, which show one embodiment of apparatus for putting the method into effect, and a working graph, and in which:

FIG. 1 is a schematic view of apparatus which enables the method to be put into practice, in the case of the example mentioned above, and FIG. 2 is a graph illustrating the results achieved in the case of this example.

Referring now to the drawings, the apparatus shown in FIG. 1 includes a treatment column made up of three parts: a lower part 1a in which air is cooled and dried, an intermediate part 1b for the adjustment of the temperature of the stream of air, and an upper part 1c where the freeze-drying of the product takes place.

At its base, the lower part 1a receives an input G1 of air via a valve 2 which allows the size of this input to be adjusted, and via a flowmeter indicated at 3 which allows the input to be measured.

This lower part is surrounded by an annular shell 4 in which circulates a refrigerant fluid of the freon type which comes from an ancillary cold unit. The lower part contains an auxiliary fluidised bed 5 of particles of adsorbent, such as activated alumina for example, so that the air will be cooled and dehydrated in this part.

The adsorbent making up this auxiliary bed may be continuously extracted through a duct 6 and re-introduced after regeneration through a duct 7.

Into the intermediate part 1b is admitted an input of air G2 at ambient temperature which mixes with the input G1. This input G2 is regulated by means of a valve 8 and measured by means of a flowmeter indicated at 9.

By adjusting the ratio G1/G2 it is possible accurately to regulate the temperature of the air in the upper part of the column. A blower 10 is responsible for circulating the air.

The upper part 1c of the column contains a diffuser 11 above which is arranged a fluidised bed 12 of particles of an adsorbent such as activated alumina. The particles of adsorbent in this bed 12 are extracted continuously through a duct 13 and are re-introduced continuously through a duct 14 after regeneration, so that the moisture level will remain substantially constant in the course of treatment.

The air is collected again at the head of the column and drawn in by the blower 10 via a cyclone which traps any particles which are liable to have been picked up.

The product to be freeze-dried, which is indicated at 15, is placed within the fluidised bed 12 by means of a suitable support such as a grille 16 suspended from rods 17 which allows the particles of adsorbent to pass through.

A description will be given below by way of example of the conditions under which it has been possible to freeze-dry a piece of carrot. The piece was in the form of a disc 3 cm in diameter and 3.5 mm thick weighing an initial 3.17 grammes, 2.80 of which were water. It was frozen beforehand at a temperature lower than $-30°$ C.

The column 1 used in this trial was 10 cm in diameter and the fluidised bed 12 was a bed of activated alumina, the particles of which had mean dimensions between 250 and 500 microns. At any therefore given time the bed contained a mass of 1 kilogram of alumina and was approximately 15 centimeters in depth.

The minimum fluidisation speed $V_{mf}$ of this adsorbent was 11.8 cm/sec. The input of air was adjusted to 5 m$^3$/hour, which corresponds to a transit speed through the fluidised bed 12 of 17.7 cm/sec.

The freeze-drying was conducted at atmospheric pressure and the temperature at which the product begins to melt was approximately $-5°$ C.

The temperature within the bed was measured by means of a multichannel recorder and the partial pressure of water vapour by means of an electrolytic hygrometer.

The ratio between inputs G1/G2 was so adjusted that the temperature of the fluidised bed settled at $0°$ C. and the regeneration throughput of adsorbent was so adjusted that the pressure of water vapour settled at approximately 0.039 mm of mercury.

Figure 2:
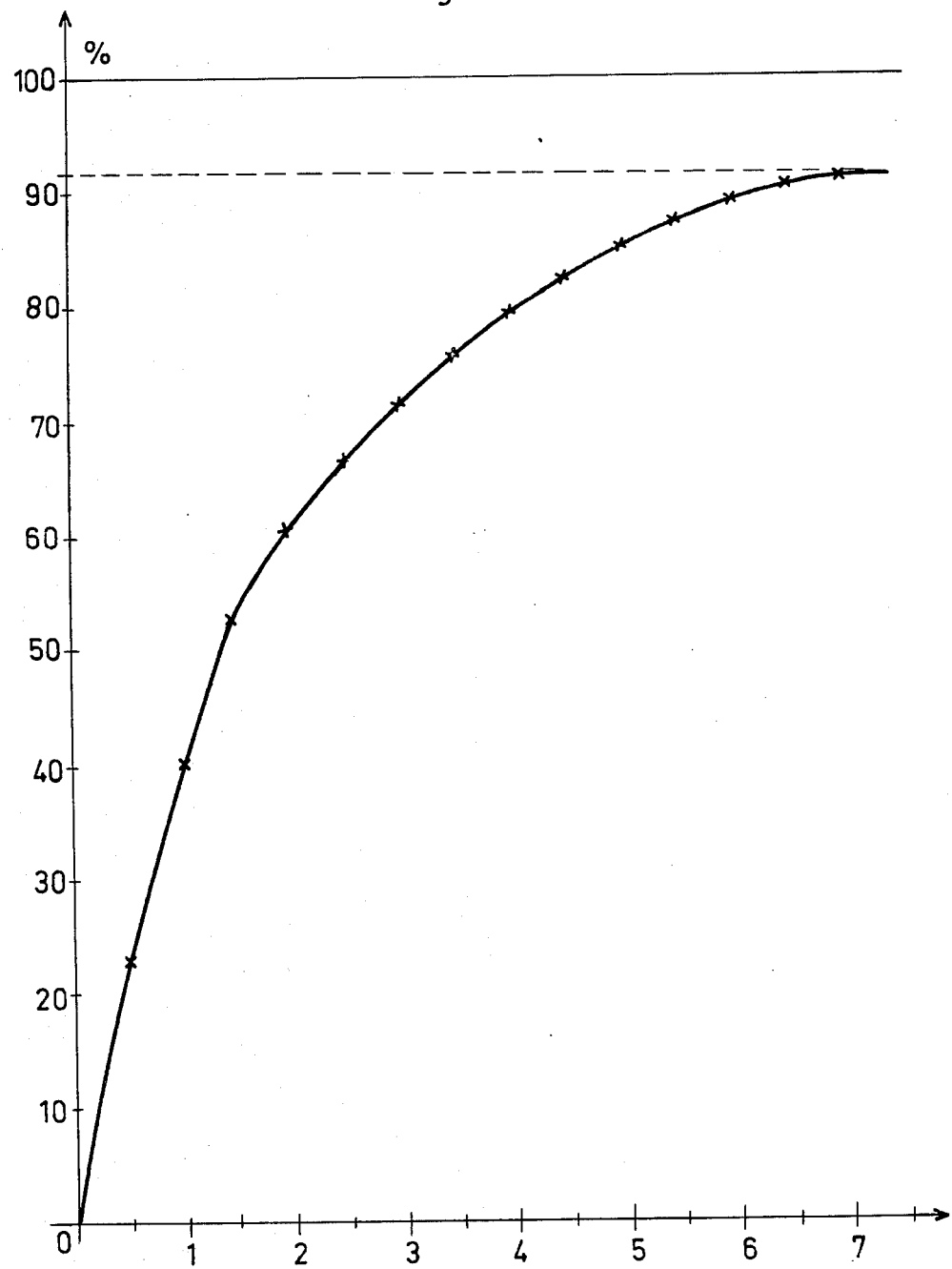

The graph in FIG. 2 illustrates the results of freeze-drying to constant temperature by showing, as a function of time, the percentage by weight of water sublimed in relation to the initial quantity of water. The percentage of water sublimed is determined by weighing the piece of carrot. After seven hours a plateau is reached at which 92% of the water has been sublimed. It may be considered that the freeze-drying is complete, the small percentage of water which remains being bonded water.

Freeze-drying an identical piece of carrot under vacuum in a conventional apparatus reveals a treatment time of the order of three times as long for the same efficiency.

It may be mentioned that the speed of freeze-drying is at a maximum at the beginning of the trial (the slope of the curve) and is equal to 0.08 g of water sublimed per hour per cm$^2$ of product surface.

The curve has a linear part where this speed is substantially constant. The transfer phenomenon proceeds by an external diffusion mechanism which develops at the surface of the product. The speed then falls off fairly abruptly owing to a change in the transfer mechanism: the limiting stage derives from an internal diffusion mechanism through the product.

An example of this kind thus demonstrates that the method of the invention enables a product to be effectively freeze-dried at atmospheric pressure while operating at a temperature ($0°$ C.) higher than the temperature at which the product begins to melt ($-5°$ C.), under conditions of remarkable economy and by means of an apparatus of very simple structure. The freeze-drying speeds achieved are considerably higher than the speeds reported in the literature for conventional methods.

In any particular application, the optimum operating conditions may be arrived at by experiment by means of a series of tests made with samples of the product. In particular it should be pointed out that the speed of freeze-drying can be increased still further by raising the temperature of the fluidised layer as soon as the internal diffusion mechanism starts to predominate.

The quantity of adsorbent in the fluidised bed and the rate of regeneration determine the partial pressure of water vapour in the enclosure. In practice, in many applications, these parameters may be adjusted so that this partial pressure is of the order of 0.1 mm of mercury. This value represents a good compromise which enables both a high freeze-drying speed and economical conditions of operation to be achieved. The temperature of the fluidised bed is adjusted by successive trials to a level slightly lower than the limiting level beyond which the frozen water in the product is no longer sublimed into water vapour but melts into liquid. After this value one of the interface conditions (interface temperature less than the temperature at which melting starts, or partial pressure of water vapour at the interfaces less than the triple point pressure for water) ceases to be satisfied. This limit may be detected by visual observation or by means of a thermocouple placed on the surface of the product which enables the changes in the interface temperature to be followed and the change in the nature of the phenomenon to be made apparent.

What we claim is:

1. A method of freeze-drying a previously frozen product comprising fluidising a finely divided solid particulate water vapour adsorbent by placing said absorbent in suspension in a carrier gas having a low moisture content in an enclosure, placing said frozen product in said fluidised adsorbentm adjusting the temperature of the fluidised adsorbent and the partial pressure of water vapour in said enclosure to levels at which frozen water contained in said product will sublime.

2. A method of freeze-drying according to claim 1 including adjusting the temperature of the fluidised layer and the partial pressure of water vapour in the enclosure so that the interface temperature at the frozen areas of the product is at all times lower than a threshold equal to the temperature $T_f$ at which the product begins to melt at the overall pressure prevailing in the enclosure, the partial pressure of water vapour being at all times maintained below that which corresponds to the triple point of water.

3. A method of freeze-drying according to claim 2, including mixing the product intimately with the adsorbent and fluidising the product with the adsorbent.

4. A method of freeze-drying as in claim 3 and including adjusting the speed of the carrier gas to a value between about 1.3 $V_{mf}$ and about 1.7 $V_{mf}$, $V_{mf}$ being the minimum fluidisation speed of the mixed adsorbent and product.

5. A method of freeze-drying according to claim 2, including placing the product in the fluidised layer on a support adapted to permit good contact between the outer surfaces of the product and the fluidised layer.

6. A method of freeze-drying according to claim 2, and including adjusting the partial pressure of water vapour in the enclosure to a level lower than approximately one-fiftieth of the triple point pressure for water, while adjusting the temperature of the fluidised layer to the maximum permissible value which, at said partial pressure, allows an interface temperature close to the temperature at which melting begins.

7. A method of freeze-drying according to claim 1 and including carrying out said freeze-drying with the overall pressure prevailing in the enclosure equal to atmospheric pressure.

8. Method of freeze-drying according to claim 1 and including carrying out said method in discontinuous cycles, and placing the adsorbent in the enclosure at the beginning of each cycle so that its mass relative to that of the product, and its initial moisture content, give rise, at the end of the cycle, to a partial pressure of water vapour in the enclosure at which the frozen water will sublime.

9. A method of freeze-drying according to claim 1 and including carrying out the method continuously, and supplying said enclosure continuously with regenerated adsorbent at a rate and a moisture content such that the partial pressure of water vapour in the enclosure at all times will permit sublimation, and extracting said adsorbent continuously at an equal rate, and regenerating the extracted adsorbent.

10. A method of freeze-drying according to claim 1 and including adjusting the speed of the carrier gas to a value between approximately 1.3 $V_{mf}$ and approximately 1.7 $V_{mf}$, $V_{mf}$ being the minimum fluidisation speed of said adsorbent.

11. A method of freeze-drying according to claim 1, wherein said adsorbent is of a granular size between 100 microns and 1 millimeter.

* * * * *